Aug. 7, 1962  P. G. MAGNER, JR  3,047,934
BONDING NYLON TO STEEL
Filed Feb. 4, 1959
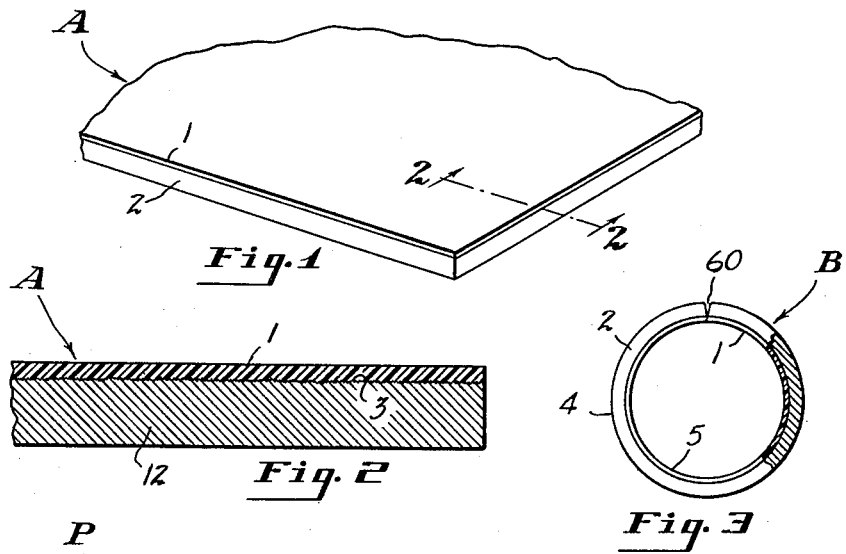
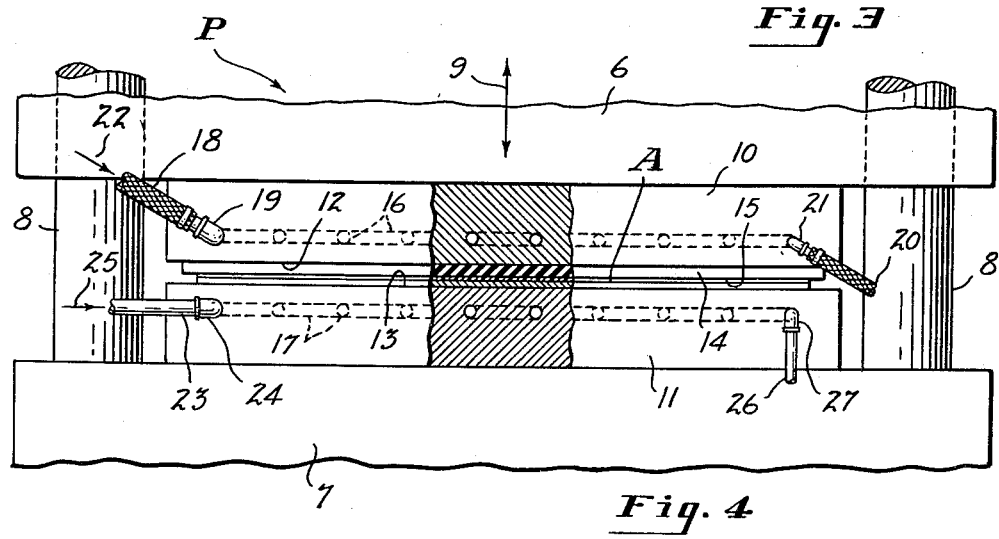
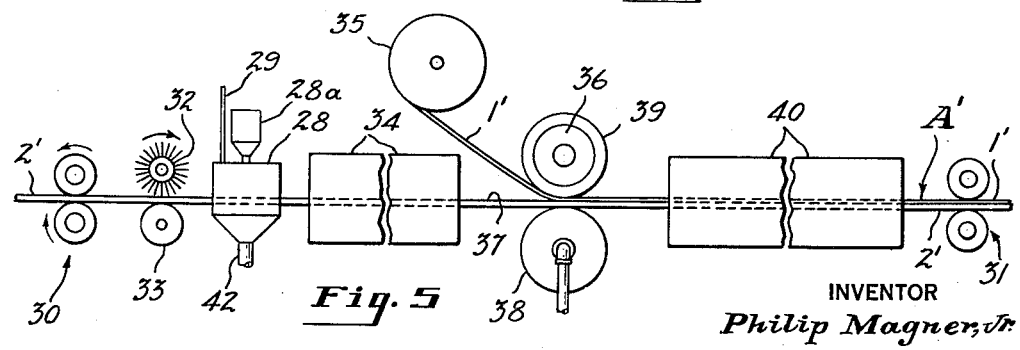
INVENTOR
Philip Magner, Jr.
BY McCoy, Greene + TeGrotenhuis
ATTORNEYS United States Patent Office 3,047,934
Patented Aug. 7, 1962

3,047,934
BONDING NYLON TO STEEL
Philip G. Magner, Jr., Marion, Ind., assignor to The General Tire & Rubber Company, Akron, Ohio, a corporation of Ohio
Filed Feb. 4, 1959, Ser. No. 791,236
7 Claims. (Cl. 29—149.5)

The present invention relates to the bonding of nylon plastic material to steel and similar metal surfaces and more particularly to a method of bonding with heat and pressure which does not require adhesives.

Heretofore the bonding of plastics to metal by application of pressure without adhesives has been disappointing because of the tendency for the plastic layer to peel off. I have found that the bond obtained by pressing a nylon sheet against a roughened metal surface is rather weak but that exteremely strong bonds having strengths approaching the breaking strength of the material can be obtained by heating the nylon sheet to a predetermined temperature for a predetermined time to strengthen the bond obtained by the original application of pressure. Thus, by heating a laminated nylon-steel sheet to a high temperature no more than 40° F. below the melting point of the nylon for several minutes it is possible to obtain extremely strong bonds. By heating a laminated sheet comprising a layer of steel bonded to a layer of polycaprolactam to a temperature of about 380° F. for three to eight minutes, and preferably four to six minutes, the strength of the bond is increased so as to approach the tensile strength of the nylon sheet.

The present invention is very important since it avoids the use of adhesives and simplifies manufacture so as to reduce the cost of the laminated nylon-metal articles. Many useful articles may be made from the laminated sheets including nylon bearings formed by bending the sheet into a cylinder.

An object of the present invention is to provide improved adhesion between steel and nylon.

A further object of the invention is to reduce the cost of adhering nylon to iron, steel, or similar metals.

Other objects of the invention are to provide a simple method of bonding which does not require adhesives and to provide a simple, inexpensive, continuous process for the laminating of nylon and steel.

A still further object of the invention is to provide an improved nylon bearing and a simple method of making the same.

Other objects, uses and advantages of the present invention will become apparent to those skilled in the art from the following description and claims and from the drawings in which:

FIGURE 1 is a fragmentary perspective view on an enlarged scale showing a laminated nylon-steel sheet made according to the present invention;

FIGURE 2 is a fragmentary vertical sectional view taken on the line 2—2 of FIG. 1 on a larger scale;

FIGURE 3 is an elevational view with parts broken away and shown in vertical cross section showing a nylon bushing made by bending the laminated sheet of FIGS. 1 and 2;

FIGURE 4 is a fragmentary elevational view with parts broken away and illustrated in vertical cross section showing a press for heating and pressing the nylon and steel according to the method of the present invention; and FIGURE 5 is a foreshortened diagrammatic view on a reduced scale showing apparatus for performing the present invention as a continuous process.

Referring more particularly to the drawings in which like parts are identified by the same numerals throughout the several views, FIGURES 1 and 2 show a laminated nylon-steel sheet A comprising a rectangular layer 1 of nylon having a uniform thickness and a rectangular layer 2 of steel having a uniform thickness and bonded to the nylon layer throughout the length and width thereof. The layer 2 has a generally flat surface 3 which is cleaned thoroughly to remove any metal oxide or dirt on the surface of the metal and is roughened by grit blasting or other suitable method prior to application of the nylon layer.

After the laminated sheet is heated according to the method of the present invention to strengthen the bond between the nylon and the steel, the laminated sheet may be bent to a circular cross section to form a cylindrical nylon bearing B having an outer cylindrical surface 4 of steel and an inner cylindrical nylon surface 5, the ends of the laminated sheet abutting as indicated in FIG. 3 to form a seam or joint 6 extending the full length of the bearing. The thin nylon layer is sufficiently flexible to permit such shaping without injuring the bond or tearing the nylon. The bearing B may have any suitable axial length and usually has a length corresponding to the width of the laminated sheet A, but the bearing may have a length which is only a fraction of the width of the laminated sheet as where the cylinder formed by rolling the sheet is cut or sawed into short sections. If desired, the seam 6 may be welded or brazed. The inner nylon surface 5 of the bearing B provides an excellent antifriction bearing surface which wears well in service. Bearings of this type have numerous applications as will be apparent to those skilled in the art.

FIGURE 4 shows a portion of a hydraulic press P which may be used to perform the method of the present invention. The press P has upper and lower platens 6 and 7 and vertical guide rods 8 rigidly connected to the lower platen 7. The upper platen 6 is mounted to slide vertically on the guide rods 8 and is actuated by reciprocating hydraulic motors (not shown) which may be controlled manually in any suitable manner. The upper platen may be moved upwardly and downwardly at will in the direction indicated by the arrow 9 in FIG. 4. Rigid upper and lower plates 10 and 11 are rigidly connected to the upper and lower platens, respectively. The upper plate has a flat lower surface 12, and the lower plate 11 has a similar flat surface 13 parallel to the surface 12. An elastic rubber pressure pad 14 of uniform thickness is bonded to the surface 12 and moves upwardly with the upper platen out of engagement with the work. Said pad has a flat lower surface 15 parallel to the surface 13.

The upper and lower platens are provided with heating pipes or coils 16 and 17 of any suitable type for heating the upper and lower plates 10 and 11 to any desired temperature. These heating coils provide passages for conveying steam through the upper and lower plates 10 and 11 as is apparent in FIG. 4. A flexible inlet conduit 18 is attached to the inlet connection 19 of the upper heating coil, and a similar flexible conduit 20 is connected to the exhaust connection 21 to remove the steam or condensate, the direction of steam flow being indicated by the arrow 22. A rigid supply conduit 23 is attached to the inlet connection 24 of the lower coil to supply steam or other suitable heating fluid to the lower plate, the direction of steam flow being indicated by the arrow 25. A condensate pipe 26 is attached to the outlet connection 27 of the lower coil to remove steam or condensate from the coil 17.

Steam may be admitted at different pressures to the heating coils to heat the upper and lower plates and their working surfaces 12 and 13 to any desired temperature between 300° F. and 500° F. The temperature of the upper and lower plates may be closely regulated as will be understood by those skilled in the art. The rubber material used to form the pad 14 is compounded so as to be able to withstand the high temperatures without being cured excessively. Various elastomeric compounds can be used for the pad 14 including rubber compounds used to make rubber curing bags for vulcanizing pneumatic tires. Various butyl rubber compounds may be used, particularly those cured with alkyl-substituted dimethylol phenols as disclosed, for example, in the copending application of O. C. Elmer et al., Serial No. 748,932, filed July 16, 1958.

It will be noted in FIG. 4 that the rubber pad 14 has a greater surface area than the rectangular sheet A so as to completely cover said sheet when the sheet is squeezed between the surfaces 13 and 15. It will also be noted that the coils 16 and 17 each extend the full length and width of the sheet A so as to heat the entire sheet with a substantial degree of uniformity. It is thus possible to heat the entire laminated sheet A to substantially the same high temperature.

FIGURE 5 shows diagrammatically a modified form of apparatus for performing a continuous process according to another method of the present invention. This apparatus includes a first pair of feed rolls 30 for feeding a steel sheet 2' and has a similar pair of feed rolls 31 for pulling the finished laminated sheet A' out of the apparatus. As the steel sheet 2' moves from the feed rolls 30 to the feed rolls 31, it first passes between a wire brush 32 or grinding wheel and an idler roller 33 and it then enters a grit-blasting chamber 28 where it is bombarded by abrasive particles entering the hopper 28a and given a high velocity by the compressed air from conduit 29, the abrasive being removed through the exhaust conduit 42 by suction as fast as it enters the chamber 28. After leaving the chamber 28 the steel sheet enters a first-heating chamber or oven 34 which preheats the steel to a predetermined temperature between 300° and 400° F. A continuous strip 1' is unwound from a supply roll 35 and passes between an idler roller 36 and the hot upper surface 37 of the steel sheet. An idler roller 38 is provided directly below the roller 36 to press the hot steel sheet 2' against the nylon sheet 1' to adhere the nylon to the hot steel surface 37. The idler 36 is preferably provided with an externally cylindrical rubber sleeve 39 which is sufficiently elastic to yield when the pressure between the rollers 36 and 38 becomes excessive. As the laminated sheet A' leaves the idlers 36 and 38 it enters a second heating chamber or oven 40 which may be heated to any desired temperature between 300° and 500° F. The heating chambers 34 and 40 may employ heated gases, steam, radiant heating, dielectric heating, induction heating, or any other suitable means for heating the sheet traveling therethrough, and the temperature and heating time in each of the chambers 34 and 40 may be closely controlled in any suitable manner and/or correlated with the speed of the moving sheet 2'.

The method of the present invention is particularly applicable to nylon plastics such as polycaprolactam or polyhexamethylene adipamide. The steel, iron, or other metal surface which is to be bonded to the nylon is first cleaned thoroughly to remove rust, scale, grease, or the like, and is then roughened by grit blasting or by abrasive wheels or the like. Any dust remaining after the abrasive roughening process is removed, for example, by rinsing the metal surface with a clean fast-drying solvent. After the metal surface is cleaned it is heated to a temperature preferably about 20° to 100° F. below the melting point of the nylon material to be applied thereto while avoiding oxidation of the metal. While the metal is at such temperature the nylon and heated metal are combined by application of pressure avoiding excessive pressure at any point along the surface of the metal. The pressure is preferably equalized over the area of the metal by using an elastic pad, a rubber-covered pressure roll or the like.

The application of pressure between the nylon layer and the clean uncoated surface of the metal firmly attaches the nylon to the metal but the nylon can be removed by peeling the nylon film off. In order to strengthen the bond the laminated nylon-metal article is further heated for several minutes to a temperature 1° to 40° F. below the melting point of the nylon. The laminated nylon-metal article is usually heated to a temperature of 350° to 450° F. for an inversely related time of about 3 to 15 minutes. Where the nylon is "Zytel 63" or other polycaprolactam, the laminated article is heated to a temperature of about 380° to 400° F. for an inversely related time of 3 to 8 minutes. The application of this heat for a few minutes at the proper temperature improves the bond to such an extent that it becomes impossible to peel a continuous film since the nylon tears before the bond is broken. It is thus possible to obtain bonds as good as those obtained with the best available adhesives. The nylons preferred for bonding according to the present invention are those having a wide softening range. The nylons having a sharp melting point such as "Zytel 101" produce bonds which are not as good as those obtained with other nylons.

When the method of the present invention is performed using apparatus as illustrated in FIG. 4 the metal sheet 2 may be preheated to the desired temperature (which for coating with polycaprolactam is 330° to 380° F. and preferably about 340° to 360° F.) by placing the metal sheet on the surface 13 of the bottom plate and passing steam through the heating coils 17. As soon as the metal surface 3 reaches said desired temperature the nylon sheet 1 may be placed on the metal sheet with the end edges of the nylon substantially in alignment with the end edges of the metal sheet. While the layers 1 and 2 are superimpsed in this manner in alignment with the rubber pad 14 as shown in FIG. 4 the upper platen 6 may be lowered by hydraulic pressure to force the pad 14 against the nylon layer 1 and press the nylon and steel together. It will be understood that the nylon layer 1 is applied to the metal sheet 2 before the sheet 2 is oxidized and while the surface 3 is hot and perfectly clean so that a good bond may be obtained.

During the application of pressure to the layers 1 and 2 to form the laminated sheet A, the heating may be discontinued or the surface temperature of the metal surface 3 may be maintained at the temperature to which it was heated (i.e. 350° F. when applying polycaprolactam) and sufficient heating may be applied to maintain such temperature. The temperature of the metal is not, however, so high as to melt the nylon or cause excessive plastic flow thereof. After the hydraulic pressure is reduced to a low value so that the pad 14 no longer applies a substantial pressure to the laminated sheet A and while the pad 14 is still in contact with the laminated sheet, steam or other heating fluid may be passed through the coils 16 and 17 to heat the laminated sheet to a temperature 1° to 40° below the melting point of the nylon for the desired period of time. After the heating period the platen 6 may be elevated and the laminated sheet cooled and removed from the apparatus P. It will be understood, of course, that the initial and the final heating need not be accomplished in the hydraulic press but may be done in separate apparatus.

When using the apparatus shown in FIG. 5 a continuous metal strip 2' is provided and this strip is preferably cleaned thoroughly to remove grease and other deposits prior to passing the feed rolls 30. As the sheet moves from rolls 30 to the feed rolls 31 it may be further cleaned by the wire brush or abrasive wheel 32. The strip 2' then is grit-blasted in the chamber 28 by abrasive particles fed to the hopper 28a, the particles being propelled at high velocity by compressed air from the air line 29. The spent abrasive particles are then removed through the exhaust conduit 42 which is preferably connected to a suction pump or other source of subatmospheric pressure. If desired, the dust on the sheet 2' may be washed off by a suitable fast-drying solvent as the strip 2' leaves the chamber 28. Such solvent would be quickly evaporated at the first heating chamber 34 which heats the strip 2' to the desired temperature (for example, 350° F.) before the sheet contacts the nylon sheet 1'.

The nylon sheet is unwound from the supply roll 35 and is pressed against the metal strip under a high pressure between rubber sleeve 39 of the pressure roll 36. The high pressure between the pressure rolls 36 and 38 provides a good bond between the nylon and the steel strip. The resulting laminated strip A' is then heated to a temperature 1° to 40° F. below the melting point of the nylon in the heating chamber 40, said heating chamber having a sufficient length to heat the laminated strip for the desired period of time (i.e., 3 to 15 minutes). The laminated strip is cooled sufficiently as it moves from the heating chamber 40 to the feed rolls 31 so that the feed rolls do not cause plastic flow due to their pressure on the nylon layer 1'.

The temperature and times for the heating process of of the present invention are critical since over heating or under heating results in poor bonds between the nylon and the steel. It is, perhaps, for this reason that those skilled in the art did not figure out how to obtain satisfactory bonding of plastic to steel without the use of adhesives.

Example I

A flat rectangular plate of S.A.E. 1025 steel with a uniform length of 3.10 inches, a uniform width of 1.63 inches and a uniform thickness of 0.060 inch is cleaned thoroughly with muriatic acid, and one face thereof is roughened by blasting with abrasive. The abrasive dust is removed by washing the metal plate in methyl ethyl ketone, and the metal plate is heated to a temperature of 350° Fahrenheit between the upper and lower plates 10 and 11 of the apparatus shown in FIG. 4. The upper platen 6 is then elevated and a thin sheet of polycaprolactam with a thickness of 0.005 inch is placed over the heated metal plate in engagement with the rough gritblasted surface of said plate so as to cover the plate completely. The upper platen is then lowered and a pressure of 120 p.s.i. is applied to press the nylon and steel together while the steel plate is at a temperature of 350° F. The above pressure is applied for 3 seconds and then the pressure is reduced to about 1.0 p.s.i. and the temperature is increased to 400° F. for 5.0 minutes, heating steam being admitted to both of the heating coils 16 and 17.

The laminated nylon-steel plate is then removed from the hydraulic press and bent to form a cylindrical bearing member similar to that shown in FIG. 3 and having an internal diameter of about one inch. The resulting bearing is very durable and provides excellent service.

The five-minute heating at 400° F. greatly improves the strength of the bond between the nylon and the steel. After the initial application of pressure the nylon layer is firmly attached to the steel but a continuous film can be peeled off from the steel. For some unknown reason the heating for five minutes strengthens the bond between the nylon and steel so that it is impossible to peel a continuous film, the nylon tearing before the bond is broken.

The metal objects to which nylon may be bonded according to the method of the present invention may be flat, curved or irregular in shape, and the nylon layer may also vary in the thickness and shape.

It will be understood that the above description is by way of illustration, rather than limitation, and that, in accordance with the provisions of the patent statutes, variations and modifications of the specific methods disclosed herein may be made without departing from the spirit of the invention.

Having described my invention, I claim:

1. A process of bonding an iron sheet to a layer of polycaprolactam comprising cleaning said sheet and roughening the surface thereof, heating said sheet to a temperature of about 330° to 370° F., pressing said layer directly against the roughened surface of said sheet while said surface is free of oxides and other foreign material and while said sheet is at said temperature to adhere the layer to the sheet and form a laminated sheet, discontinuing said pressing and heating the laminated sheet to a temperature of about 380° to 400° F. for about 3 to 8 minutes to strengthen the bond between said sheet and said layer without melting said layer.

2. A process of bonding a nylon layer to a steel sheet comprising adhering the nylon layer to said sheet by application of high pressure, releasing said pressure, and heating the resulting laminated sheet to a temperature 1° to 40° F. below the melting point of the nylon for an inversely related time of 3 to 15 minutes while said pressure is released to increase the strength of the bond between the nylon and the steel.

3. A method of strengthening nylon-to-metal bonds in a laminated article comprising heating the article to a temperature about 5° to 30° F. below the melting point of the nylon for at least 3 minutes without applying substantial pressure thereto.

4. A process of bonding an iron sheet to a layer of nylon comprising cleaning said sheet and roughening the surface thereof, applying a high pressure and pressing the nylon layer directly against the roughened surface of said sheet while said surface is free of oxides and other foreign material to adhere the layer to the sheet and to provide a bond having a strength less than that of the nylon, releasing said pressure, and heating the resulting laminated article to a temperature 1° to 40° F. below the melting point of the nylon for at least three minutes while said pressure is released to increase the strength of said bond to a value at least as great as the strength of the nylon.

5. A process of bonding a metal sheet to a layer of nylon comprising cleaning said sheet and roughening the surface thereof, applying a high pressure and pressing the nylon layer directly against the roughened surface of said sheet while said surface is free of oxides and other foreign material to adhere the layer to the sheet and to provide a bond having a strength less than that of the nylon, releasing said pressure, and heating the resulting laminated article to a temperature of 350° F. to 450° F. for an inversely related time of about 3 to 15 minutes while said pressure is released to increase materially the strength of the bond between said sheet and said layer without melting said layer, said laminated article having a substantially straight cross section throughout its length.

6. A process as defined in claim 5 wherein the nylon is polycaprolactam and said heating increases the strength of said bond to a value no less than the strength of the polycaprolactam.

7. A process as defined in claim 6 wherein the resulting laminated article is bent into the form of a split cylindrical bearing having an internal cylindrical nylon surface and having ends in contact at the longitudinal seam.

References Cited in the file of this patent

UNITED STATES PATENTS

| | | |
|---|---|---|
| 2,044,897 | Boeghold | June 23, 1936 |
| 2,124,060 | Gilman | July 19, 1938 |
| 2,324,082 | Holmes | July 13, 1943 |
| 2,629,907 | Hugger | Mar. 3, 1953 |
| 2,720,119 | Sherman | Oct. 11, 1955 |
| 2,732,613 | Renholts | Jan. 31, 1956 |
| 2,786,264 | Colombo | Mar. 26, 1957 |
| 2,885,248 | White | May 5, 1959 |